UNITED STATES PATENT OFFICE.

DANIEL MACDUGALD KENNEDY, OF PETROLIA, ONTARIO, CANADA.

DESULPHURIZING AND PURIFYING PETROLEUM-OILS.

SPECIFICATION forming part of Letters Patent No. 370,950, dated October 4, 1887.

Application filed March 10, 1887. Serial No. 230,438. (No specimens.) Patented in Canada October 25, 1886, No. 25,201.

*To all whom it may concern:*

Be it known that I, DANIEL MACDUGALD KENNEDY, a subject of the Queen of Great Britain, residing at the town of Petrolia, in the county of Lambton, in the Province of Ontario, Dominion of Canada, have invented a new and useful Improvement in Desulphurizing and Purifying Petroleum-Oils, (for which I have received Letters Patent in Canada, No. 25,201, dated October 25, 1886;) and I do hereby declare that the following is a full, clear, and exact description of the invention, which will enable others skilled in the art to which it appertains to make and use the same.

To desulphurize and purify petroleum (hydrocarbon) oils I take of sulphate of copper, (blue vitriol,) caustic soda, and chloride of sodium (common salt) about equal quantities and dissolve the same together in water. I prefer to first dissolve the copper and chloride of sodium in water and then the soda and mix the two together, when the copper will be precipitated as oxide of copper. This solution, with its precipitate, is then put in the still with the oil, and when the oil boils, the precipitate—oxide of copper—dissolves and combines with the sulphur of the oil, forming sulphide of copper, which, with the greater portion of the solution remaining in the oil, settles to the bottom when the oil is cool, and can be drawn off. The oil then, which still contains a trace of the soda, copper, and salt held in combination mechanically, is distilled, which will cause the ingredients to separate and settle out of the oil. Instead of distilling the oil to remove the trace of the soda, copper, and salt, they may be washed out with water, sulphuric acid, and soda. This will cause the oil to be left pure and free from sulphur, so that in burning in a lamp the oil will not cloud the chimney of the lamp nor crust the lamp-wick, nor produce an offensive odor, and will give a bright and clear light.

The proportion of the solution to be used with the oil which I have found to answer best is as follows: one pound of each, sulphate of copper, (blue vitriol,) caustic soda, and chloride of sodium, (common salt,) dissolved in about two gallons of water, for every forty gallons of oil to be treated.

Having thus fully described my invention, I claim as new and desire to secure by Letters Patent—

1. The process of combining the sulphur in the oil with the metallic matter contained in a solution of about equal quantities of sulphate of copper, (blue vitriol,) caustic soda, and chloride of sodium, (common salt,) and then separating such combined metallic matter and sulphur from the oil, substantially as and for the purposes herein specified.

2. In the process herein described of desulphurizing and purifying petroleum (hydrocarbon) oils, first preparing a solution of sulphate of copper, caustic soda, and chloride of sodium, in or about the proportions specified, in water, then mixing said solution with the oil and heating the whole in a still, and subsequently separating from the oil the combined metallic matter of the solution and sulphur in the oil, as set forth.

DANIEL MACDUGALD KENNEDY.

Witnesses:
S. F. GRIFFITHS,
*Of the town of Petrolia, Solicitor.*
M. J. TROTMAN,
*Of the town of Petrolia, Law Student.*